(12) United States Patent
Abshire

(10) Patent No.: US 11,155,236 B2
(45) Date of Patent: Oct. 26, 2021

(54) METHOD AND A SYSTEM FOR CONTROLLING AND MONITORING OPERATION OF A DEVICE

(75) Inventor: Daniel Joseph Abshire, Magnolia, TX (US)

(73) Assignee: AHERN RENTALS, INC., Las Vegas, NV (US)

(*) Notice: Subject to any disclaimer, the term of this patent is extended or adjusted under 35 U.S.C. 154(b) by 467 days.

(21) Appl. No.: 12/657,130

(22) Filed: Jan. 14, 2010

(65) Prior Publication Data
US 2010/0179709 A1 Jul. 15, 2010

Related U.S. Application Data

(60) Provisional application No. 61/205,099, filed on Jan. 15, 2009.

(51) Int. Cl.
*G06F 7/00* (2006.01)
*H04B 1/38* (2015.01)
(Continued)

(52) U.S. Cl.
CPC .......... *B60R 25/00* (2013.01); *G07F 17/0057* (2013.01); *G06Q 20/206* (2013.01);
(Continued)

(58) Field of Classification Search
CPC .. B60R 25/00; G07C 9/32; G07C 9/38; G07C 9/00; G07C 9/27; G07C 9/29; G06F 21/00; G08G 1/205; G06Q 20/206
USPC ............. 701/2; 455/557, 405, 410–411, 527; 340/426.11, 426.12, 5.2, 426.1, 5.1, 340/12.22, 10.1, 539.1; 307/10.1, 10.2; 342/357.07
See application file for complete search history.

(56) References Cited

U.S. PATENT DOCUMENTS 4,438,752 A 3/1984 Cheung
4,754,255 A * 6/1988 Sanders et al. ............. 307/10.4
(Continued)

FOREIGN PATENT DOCUMENTS

EP 1043464 A2 * 10/2000

OTHER PUBLICATIONS

Enhanced soft-handoff scheme for real-time streaming services in intelligent transportation systems based on CDMA; Young-uk Chung; Dong-Ho Cho; Intelligent Transportation Systems, IEEE Transactions on; vol. 7, Issue: 2; Digital Object Identifier: 10.1109/TITS.2006.874715; Publication Year: 2006, pp. 147-155.*

(Continued)

*Primary Examiner* — Cuong H Nguyen
(74) *Attorney, Agent, or Firm* — Armstrong Teasdale LLP

(57) ABSTRACT

A method of controlling and monitoring operation of a device is disclosed. The method includes communicating an authorization code via a management source to a processor having a memory. The processor is configured for regulating operation of the device, and is operatively connected to a keyless start arrangement configured to activate the device. The method additionally includes receiving the authorization code by the processor and storing the authorization code within the controller memory. Furthermore, the method includes entering an access code via a selective input, receiving the access code by the processor, and authorizing operation of the device if the access code matches the authorization code.

21 Claims, 4 Drawing Sheets

(51) Int. Cl.
*B60R 25/00* (2013.01)
*G07F 17/00* (2006.01)
*G07C 9/29* (2020.01)
*G07C 9/32* (2020.01)
*G06Q 20/20* (2012.01)
*G08G 1/00* (2006.01)

(52) U.S. Cl.
CPC ............... *G07C 9/29* (2020.01); *G07C 9/32* (2020.01); *G08G 1/205* (2013.01)

(56) References Cited

U.S. PATENT DOCUMENTS

| | | | |
|---|---|---|---|
| 4,852,680 A | 8/1989 | Brown et al. | |
| 5,660,246 A | 8/1997 | Kaman | |
| 5,736,935 A * | 4/1998 | Lambropoulos | 340/426.16 |
| 5,821,631 A | 10/1998 | Loraas et al. | |
| 5,965,954 A * | 10/1999 | Johnson et al. | 307/10.3 |
| 5,986,542 A | 11/1999 | Hyde | |
| 6,236,120 B1 | 5/2001 | Loraas et al. | |
| 6,373,148 B1 * | 4/2002 | Daiss | B60K 28/02 307/10.1 |
| 6,424,254 B1 * | 7/2002 | Rydel | B60R 25/00 307/10.2 |
| 6,570,486 B1 * | 5/2003 | Simon et al. | 340/5.1 |
| 6,822,559 B2 * | 11/2004 | Hofbeck | B60R 25/00 307/10.2 |
| 6,897,767 B2 * | 5/2005 | Kim | G07C 9/257 340/426.35 |
| 6,898,493 B2 | 5/2005 | Ehrman et al. | |
| 7,009,499 B2 | 3/2006 | Bemosky et al. | |
| 7,138,904 B1 * | 11/2006 | Dutu | 340/5.72 |
| 7,183,666 B2 * | 2/2007 | Arakawa | B60R 25/102 307/10.2 |
| 7,388,472 B2 | 6/2008 | Mandle | |
| 7,397,363 B2 * | 7/2008 | Joao | 340/539.11 |
| 7,463,959 B2 | 12/2008 | Namaky | |
| 7,550,867 B2 * | 6/2009 | Kalb | B60R 25/00 180/281 |
| 7,962,260 B2 * | 6/2011 | DiCroce | B60R 25/00 701/36 |
| 8,751,062 B2 * | 6/2014 | Van Wiemeersch | F02N 11/0862 701/2 |
| 8,836,477 B2 * | 9/2014 | Hiramine | G07C 9/00309 340/5.72 |
| 9,193,330 B2 | 11/2015 | Abshire | |
| 9,784,229 B2 * | 10/2017 | Holub | B60R 16/033 |
| 2002/0075137 A1 * | 6/2002 | Hofbeck | B60R 25/1004 340/426.1 |
| 2002/0098835 A1 * | 7/2002 | Flick | 455/420 |
| 2003/0034873 A1 | 2/2003 | Chase et al. | |
| 2003/0036825 A1 * | 2/2003 | Kim | G07C 9/23 701/1 |
| 2003/0137398 A1 | 7/2003 | Shibata et al. | |
| 2004/0145241 A1 * | 7/2004 | Arakawa | B60R 25/102 307/10.3 |
| 2005/0073197 A1 * | 4/2005 | Matsubara et al. | 307/10.5 |
| 2005/0222720 A1 * | 10/2005 | Flick | B60R 25/00 701/2 |
| 2006/0108874 A1 * | 5/2006 | Kalb | E05B 77/02 307/10.2 |
| 2006/0129691 A1 * | 6/2006 | Coffee | H04L 67/04 709/230 |
| 2006/0182055 A1 * | 8/2006 | Coffee | H04L 67/04 370/328 |
| 2007/0032225 A1 * | 2/2007 | Konicek et al. | 455/417 |
| 2007/0279283 A1 * | 12/2007 | Flick | 342/357.07 |
| 2008/0048909 A1 * | 2/2008 | Ioffe | B60R 25/00 342/357.31 |
| 2008/0122594 A1 * | 5/2008 | Brecht et al. | 340/426.11 |
| 2009/0219135 A1 | 9/2009 | Harvey et al. | |
| 2010/0179709 A1 * | 7/2010 | Abshire | B60R 25/00 701/2 |
| 2011/0213512 A1 * | 9/2011 | DiCroce | B60R 25/00 701/2 |
| 2012/0268259 A1 * | 10/2012 | Igel | B60R 25/00 340/426.11 |
| 2014/0188309 A1 * | 7/2014 | Caratto | B60R 25/00 701/2 |
| 2014/0379174 A1 * | 12/2014 | Holub | G01R 31/382 701/2 |
| 2015/0019044 A1 * | 1/2015 | Abshire | B60R 25/00 701/2 |
| 2015/0045991 A1 * | 2/2015 | Schwitters | G05D 1/0022 701/2 |
| 2018/0218301 A1 * | 8/2018 | Shike | G06Q 10/0637 |

OTHER PUBLICATIONS

Design and implementation of a vehicular access control using RFID; Almanza-Ojeda, D.L.; Hernandez-Gutierrez, A.; Ibarra-Manzano, M.A.; Electronics and Photonics, 2006. MEP 2006. Multiconference on; Digital Object Identifier: 10.1109/MEP.2006. 335668; Publication Year: 2006 , pp. 223-225.*

Combined remote key control and immobilization system for vehicle security; Davis, B.; DeLong, R.; Power Electronics in Transportation, 1996. IEEE; Digital Object Identifier: 10.1109/PET.1996. 565920; Publication Year: 1996 , pp. 125-132.*

Resisting relay attacks on vehicular Passive Keyless Entry and start systems; Yang, Tao; Kong, Lingbo; Xin, Wei; Hu, Jianbin; Chen, Zhong; Fuzzy Systems and Knowledge Discovery (FSKD), 2012 9th International Conference on; Digital Object Identifier: 10.1109/ FSKD.2012.6234155; Publication Year: 2012 , pp. 2232-2236.*

Transient thermal performance optimization for an automotive wireless application; Chiriac, V.; Thermal and Thermomechanical Phenomena in Electronic Systems, 2008. ITHERM 2008. 11th Intersociety Conference on ; Digital Object Identifier: 10.1109/ ITHERM.2008.4544265; Publication Year: 2008 , pp. 153-158.*

Identification Technology Research on AES for Automobile Keyless System; Liu Lianhao; Ehoussou, J.; Youssouf, A.E.; Armand, Y.G.; Computational Intelligence and Software Engineering (CiSE), 2010 International Conference on Digital Object Identifier: 10.1109/CISE. 2010.5676901; Publication Year: 2010 , pp. 1-4.*

Analysis of attacks against the security of keyless-entry systems for vehicles and suggestions for improved designs Alrabady, A.I.; Mahmud, S.M.; Vehicular Technology, IEEE Transactions on; vol. 54 , Issue: 1 Digital Object Identifier: 10.1109/TVT.2004.838829; Publication Year: 2005 , pp. 41-50.*

Automobile security concerns; RR Brooks, S Sander, J Deng . . . —Published in: IEEE Vehicular Technology Magazine (vol. 4, Issue: 2, Jun. 2009) (Year: 2009).*

NFC smart tourist card: Combining mobile and contactless technologies towards a smart tourist experience; A Basili, W Liguori, F Palumbo—2014 IEEE 23rd International WETICE Conference 2014—ieeexplore.ieee.org (Year: 2014).*

CarINA—Car Sharing with IdeNtity Based Access Control Re-enforced by TPM; by Bogdan Groza, Lucian Pop, and Pai-Stefan Murvay; International Conference on Computer Safety, Reliability, and Security; SAFECOMP 2019: Computer Safety, Reliability, and Security pp. 210-222 (Year: 2019).*

Automated NFC-Based System for Management and Tracking of Assets in Sharing Economy;E Edwan, F Shaheen, A Shaheen . . . —. . . on Promising Electronic . . . , 2019—ieeexplore. ieee.org (Year: 2019).*

* cited by examiner

METHOD AND A SYSTEM FOR CONTROLLING AND MONITORING OPERATION OF A DEVICE

CROSS REFERENCE TO RELATED APPLICATIONS

This application claims the benefit of U.S. Provisional Application Ser. No. 61/205,099 filed Jan. 15, 2009, the entire contents of which are hereby incorporated by reference.

TECHNICAL FIELD

The invention relates to a method and a system for controlling and monitoring operation of a device.

BACKGROUND OF THE INVENTION

In private, as well as commercial sectors, there exists a well known need to use for a limited time, without actually purchasing, certain equipment. Such a need is typically serviced by companies that purchase the sought equipment with the intent to rent or charter such equipment to various users.

Representative equipment may include passenger vehicles, as well as earthmoving and construction equipment. In certain instances, a user of the rented equipment is required to pick-up and drop-off the equipment at a prescribed location. In certain other instances, the rental company may deliver the rented equipment to its customer's or user's job site, and collect/remove the equipment at some point after the authorized use is finished.

In a case of rental of larger construction equipment, such as excavators and loaders, the rental company often delivers the equipment a day or two prior to actual use by the customer, and may also remove the equipment a few days after the customer use is complete. Commonly, within the intervening timeframe, between the end of use and actual removal, the rental company has no direct control of the equipment. As a result, the rented equipment may be available for exploitation beyond the duration of authorized use, and, if the equipment registers additional operating hours, disputes between the renter and the owner may arise.

SUMMARY OF THE INVENTION

A first embodiment is a method of controlling and monitoring operation of a device. The method includes communicating an authorization code via a management source to a processor having a memory. The processor is configured for regulating operation of the device, and is operatively connected to a keyless start arrangement configured to activate the device. The method additionally includes receiving the authorization code by the processor and storing the authorization code within the controller memory. Furthermore, the method includes entering an access code via a selective input, receiving the access code by the processor, and authorizing operation of the device if the access code matches the authorization code.

According to the method, the included communicating an authorization code may be accomplished remotely relative to the device. The management source may be one of a host computer and a cellular telephone. Additionally, the included communicating an authorization code may be accomplished via a cell modem. Furthermore, the operation of the device may be authorized for a predetermined or limited timeframe.

The method may also include detecting unauthorized operation of the device when operation of the device occurs outside the predetermined timeframe. Additionally, the method may include communicating the detection of unauthorized operation to the host computer via the cell modem. Furthermore, the method may include remotely shutting down the operation of the device when operation of the device occurs outside the predetermined timeframe.

The act of entering the access code may be accomplished via a keypad or a cellular telephone. The contemplated device may be one of a vehicle and a construction machine. In such a case, the keyless start arrangement may be a keyless ignition system of one of the vehicle and the construction machine.

A second embodiment is a system of controlling and monitoring operation of a device. The system includes a keyless start arrangement configured to activate the device, a processor having a memory and operatively connected to the keyless start arrangement; and a management source configured to communicate an authorization code to the processor. The processor is adapted for regulating operation of the device, receiving the authorization code, storing the authorization code within the memory, receiving an access code entered via a selective input, and authorizing operation of the device if the access code matches the authorization code.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
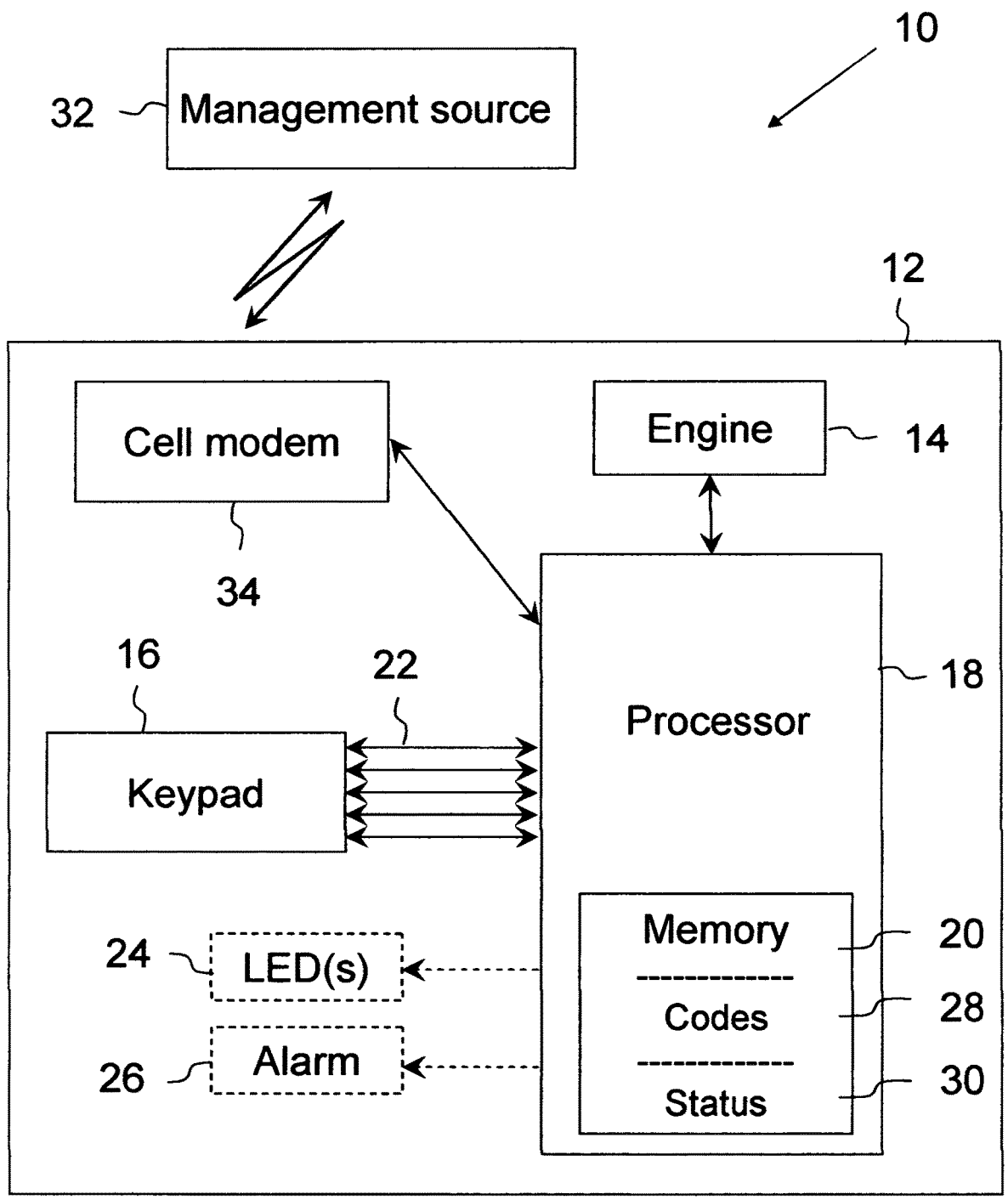
FIG. 1 is a schematic illustration of a system for controlling and monitoring operation of a device.

Referring to the drawings, wherein like reference numbers refer to like components, FIG. 1 shows a system of controlling and monitoring operation of a device 10. System 10 includes a device shown in FIG. 1 as controlled equipment 12 having an engine 14. Controlled equipment 12 may be a vehicle or a construction machine. Controlled equipment 12 additionally includes a keyless start arrangement configured as a keyless ignition system of the controlled equipment 12. The keyless ignition system includes a keypad 16, shown in FIG. 1, operatively connected to such various electronically and/or mechanically interconnected devices as a starter, coils, spark plugs, and sensors (not shown) for starting engine 14, as known by those skilled in the art. In operation, during starting of engine 14, an access code selectively entered via keypad 16 activates the engine through operation of the starter, and facilitates function of the controlled equipment 12. Controlled equipment 12 may additionally include accessories, for example, an excavator's bucket, a thumb, or a pulverizer (not shown).

Controlled equipment 12 further includes a processor 18 having a memory 20, and is operatively connected to the keypad 16 via a connecting cable 22. Memory 20 may be part of the processor 18, or a separate element operatively connected to the processor. Processor 18 is additionally connected to Light Emitting Diodes (LEDs) 24 and to an alarm system 26. Alarm system 26 is configured to generate a visual and/or audible signal when triggered in an appropriate instance by the processor 18, as understood by those skilled in the art. Memory 20 includes storage of authorization codes 28 and a matrix of equipment status checks 30, for example, of a Tamper Evident status implicating unsuccessful attempts to enter a proper access code.

System 10 further includes a management source 32 configured to communicate an authorization code to processor 18. The communication of the authorization code is provided to processor 18 remotely, i.e., across a physical distance, relative to the controlled equipment 12. The contemplated management source 32 may be a host computer or a cellular telephone, or any other device capable of providing remote communication. The processor 18 is remotely configurable, and is adapted for regulating operation of the controlled equipment 12, receiving the authorization code, storing the authorization code within the memory 20, and receiving an access code entered via a selective input at keypad 16. As a result of such integration of keypad 16 and processor 18 into the framework of controlled equipment 12, each signal resulting from pressing a button on the keypad is received directly by the processor. Processor 18 may be further adapted to authorize the operation of controlled equipment 12 for a predetermined timeframe, i.e., duration, if the entered access code is proper, i.e., matches the authorization code.

Processor 18 may be additionally adapted to record and store usage information, including operational hours by each authorized user, service and repair requirements and history, and to communicate this information to management source 32. In an optional construction of system 10 (not shown), a cellular telephone in possession of the intended user of controlled equipment 12, or in possession of the user's agent, may be employed for entering the access code and communicating thereof directly to processor 18. In such a case, controlled equipment 12 may be characterized by an absence of keypad 16.

Controlled equipment 12 additionally includes a cell modem 34 configured to communicate the authorization code from management source 32 to processor 18. Processor 18 may be additionally adapted to detect unauthorized operation of controlled equipment 12 when operation of the controlled equipment occurs outside the predetermined timeframe. Additionally, processor 18 may be adapted to communicate to management source 32 via cell modem 34 a signal indicative of the detected unauthorized operation. Furthermore, management source 32 may also be adapted to remotely shut down the operation of controlled equipment 12 when such unauthorized operation is detected.

Figure 2:
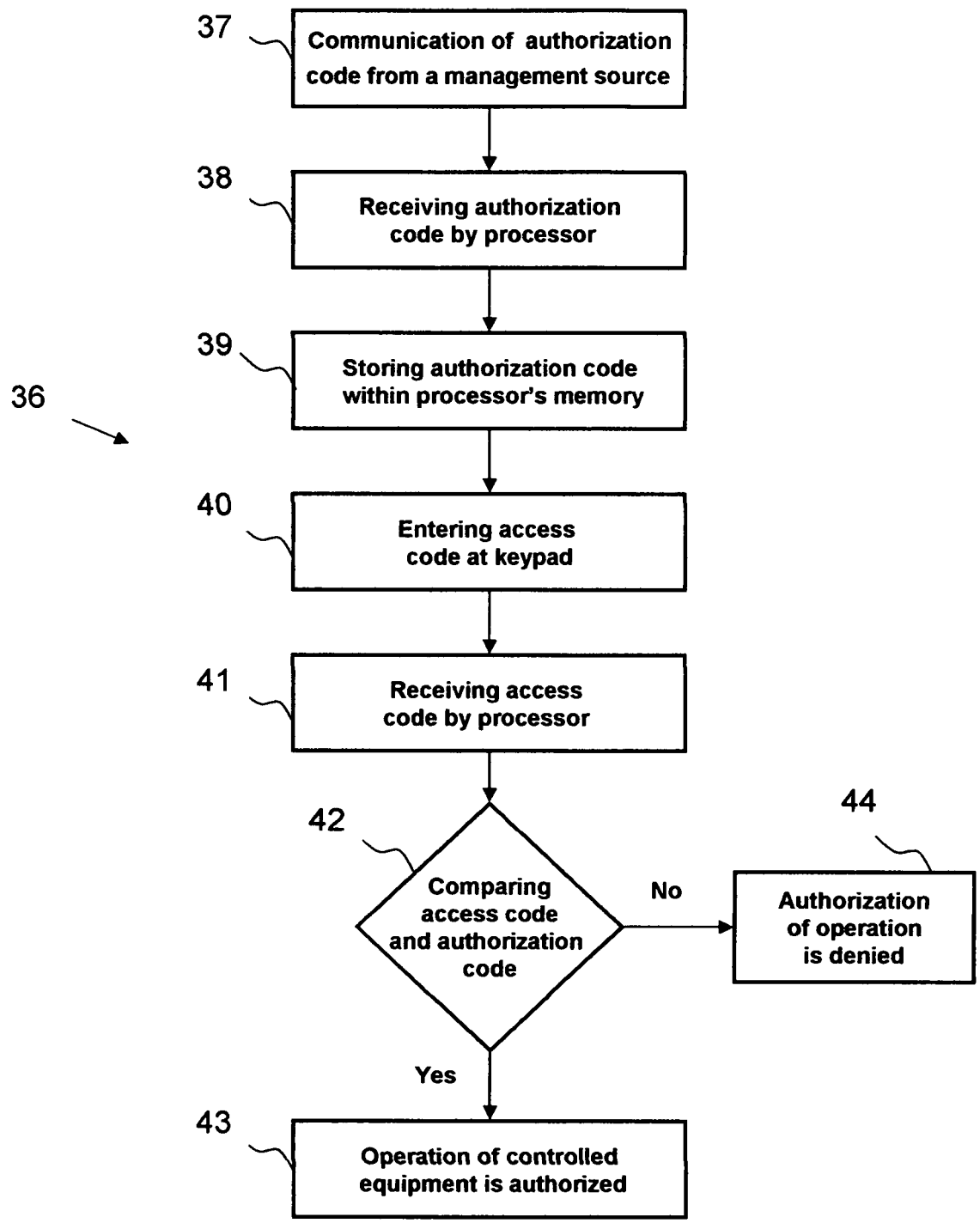
FIG. 2 is a flow chart illustrating a method of controlling and monitoring operation of the device shown in FIG. 1.

A method 36 of controlling and monitoring operation of controlled equipment is shown in FIG. 2. Method 36 starts in frame 37 by communicating an authorization code by management source 32 to processor 18. From frame 37, method 36 continues to frame 38, wherein processor receives and stores within memory 20 the authorization code sent by the management source 32. The authorization code is then stored within processor memory 20 in frame 39. Following frame 39, the method proceeds to frame 40, where an access code is entered via a selective input at keypad 16 by an intended user of the device or the user's agent. The access code is then received by the processor 18 in frame 41. From frame 41, the method advances to frame 42, where the access code received at keypad 16 is compared to the authorization code. If the access code matches the stored authorization code, the operation of the controlled equipment 12 is authorized in frame 43. The authorizing of controlled equipment 12 may be provided for a predetermined timeframe, which may be based upon an agreement between the user of the controlled equipment and the rental company. If the access code received by processor 18 does not match the stored authorization code in frame 42, such an entry of an improper access code is registered in frame 44 as an attempt at unauthorized operation of the controlled equipment 12, and operation of controlled equipment is denied.

Figure 3:
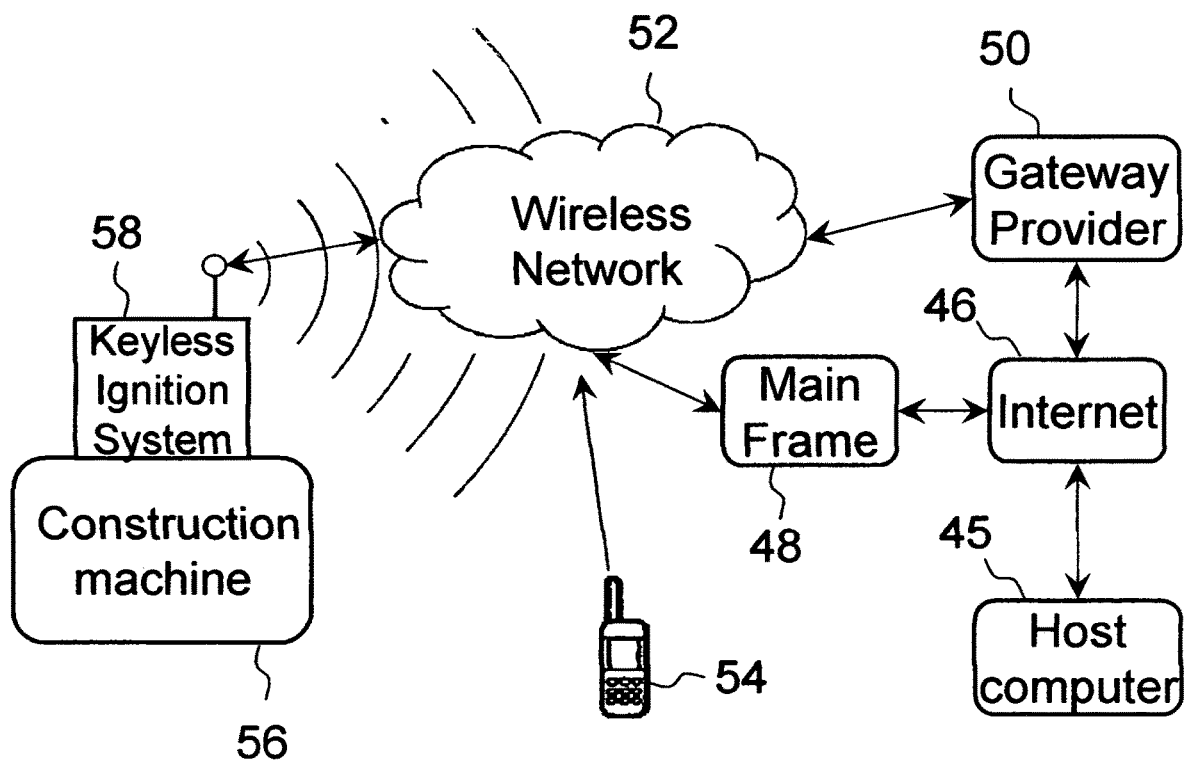
FIG. 3 is a diagram illustrating a process of signal transmission between a host computer and a keyless ignition system within a specific example of the system for controlling and monitoring operation of the device shown in FIG. 1.

FIG. 3 illustrates the communication between a rental company's host computer 45, shown in FIG. 1 as the management source 32, and a rented construction machine 56, shown in FIG. 1 as controlled equipment 12. The host computer 45 sends a controlling signal regarding changes or updates to the authorization code and the software program used by the construction machine 56. From the host computer 45, the controlling signal is transmitted to construction machine 56 via internet 46, then through a mainframe computer 48 or through a gateway provider 50, and via a wireless network 52. The information from the construction machine 56 is transferred to the host computer 45 via the same channel, but in the opposite direction. The controlling signal regarding changes or updates to the authorization code may also be sent to construction machine 56 from a mobile wireless device, shown in FIG. 2 as a cellular telephone 54. Any attempt at unauthorized use of the construction machine 56 is detected and registered by a keyless ignition system 58 mounted on the construction machine 56, such as the one described with respect to FIG. 1 The detection of an attempt at unauthorized use may be transmitted to host computer 45 of the rental company. In certain predetermined cases, such as if an attempt is made at unauthorized starting of construction machine 56 via wireless network 52, the keyless ignition system 58 activates a warning signal, and the information regarding such an attempt may also be communicated to the host computer 45.

When operation of the construction machine 56 occurs outside the predetermined timeframe, and if interruption of such operation is desired, the host computer 45 may remotely shut down the operation of construction machine 56. If interruption of unauthorized operation is not desired, the information regarding the operation may simply be communicated to and stored within the host computer 45.

The construction machine 56 may be additionally started by a controlling signal from the host computer 45 or cellular telephone 54 directly, thereby providing wireless regulation of the operating construction machine 56 from any remote location.

Consequently, the construction machine 56, or any other rental equipment, may be delivered by a rental company to a required location at any time convenient for both parties (the equipment's owner and the customer) prior to the intended use of construction machine 56. In a case where the controlled equipment 12 shown in FIG. 1 is a rented automobile (not shown), after rental usage is complete, the subject automobile may simply be left by the customer at some predetermined location. For example, the vehicle may be left at the airport parking lot, thereby not requiring a return of the subject vehicle to the actual location of the rental office.

Furthermore host computer 45 may remotely collect and store information regarding status of the construction machine 56, or any other rental equipment. For example, the following information may be collected and stored: whether the equipment is in rent or not, when it was last serviced, or whether a service repair is required.

Figure 4:
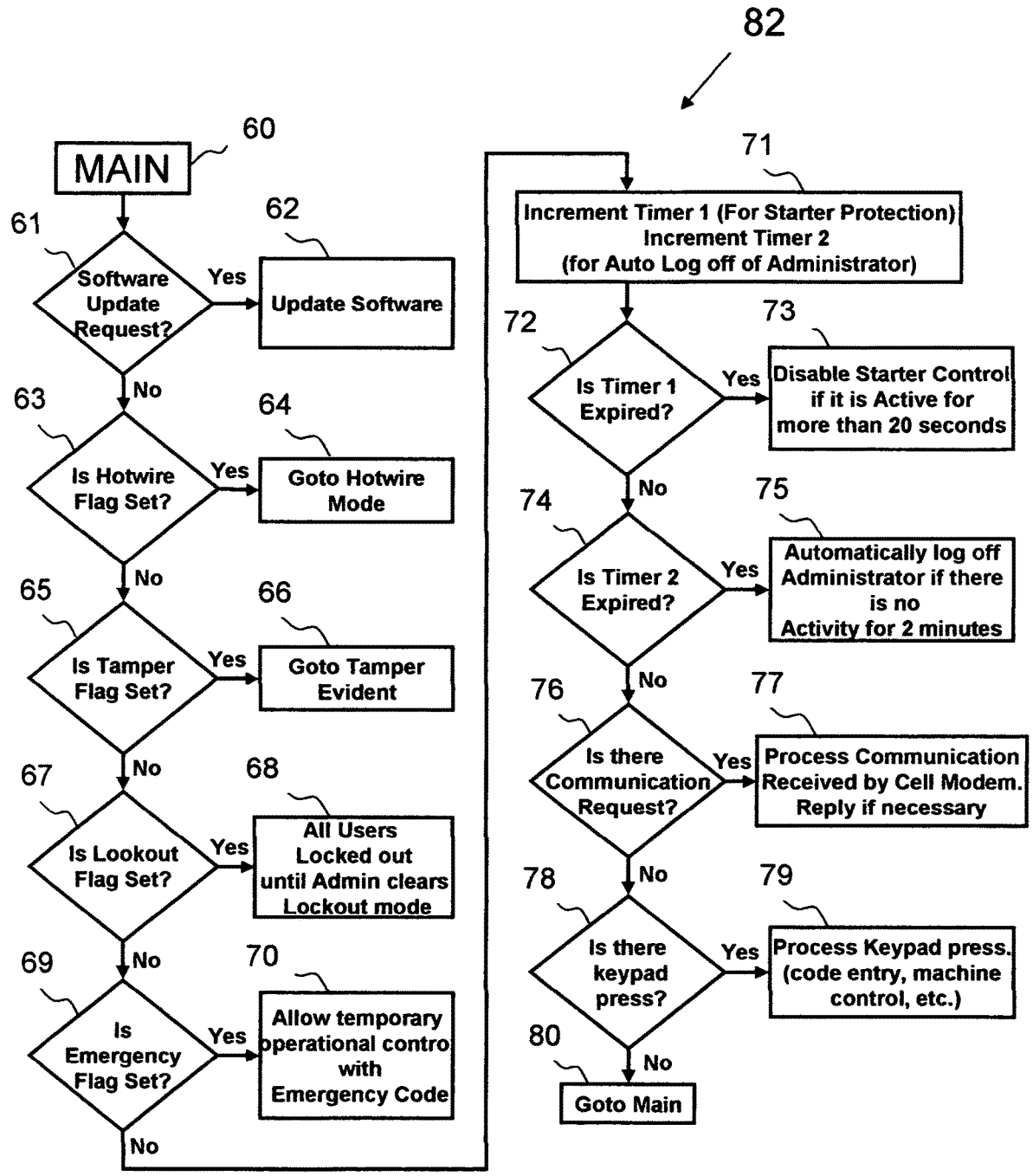
FIG. 4 is a flow chart illustrating a logical sequence which may be employed within an algorithm implemented by the system for controlling and monitoring operation of the device shown in FIG. 1.

FIG. 4 illustrates a logical sequence that may be employed by the main software algorithm 82, as implemented by the processor 18 shown in FIG. 1. Algorithm 82 starts in frame 60, termed Main. From frame 60, the algorithm continues to frame 61 and checks whether there is a request for Software Update (Serial Interrupt Request). As a result of this request, the algorithm transits to frame 62, where it updates by entering an Update Software mode. If there is no such request, the algorithm continues to frame 63, where it checks if a Hotwire condition has been detected by the processor. In case of the hotwire attempt, the algorithm transits to frame 64, where it enters the Hotwire Mode, provides notification to the host computer 40, shown in FIG. 3, and triggers alarm 26 shown in FIG. 1. If such a condition is not present, the algorithm continues to frame 65, where the algorithm checks whether the operator or any unauthorized individual has entered three or more consecutive incorrect access codes, thereby setting a Tamper Flag. If so, the algorithm transits to a Tamper Evident Mode in frame 66, where LEDs 24, shown in FIG. 1, start flashing, and a notification regarding the unauthorized attempt is provided to host computer 45, as described with respect to FIG. 3.

If a correct access code was entered in frame 66, the Tamper Flag is cleared, LEDs stop flashing, and host computer 45 is notified regarding authorized access. If the Tamper Flag is cleared, the algorithm continues to frame 67, where the software checks whether a Lockout Flag in frame 67 was set by an administrator at the construction machine 56, or by an administrator at the remote host computer 45. If the Lockout Flag is set, then the algorithm transits to a Lockout Mode in the frame 68, where all users are locked out and are no longer permitted to access and operate construction machine 56 until the Lockout Flag in frame 67 has been cleared by the administrator. If the Lockout Flag has not been set, the algorithm continues to frame 69, where the software checks whether an Emergency Flag was set by the administrator. If the Emergency Flag in frame 69 was set by the administrator, then in the next frame 70 construction machine 56 allows for temporary operational control with Emergency Code, or the algorithm transits to frame 71. If the Emergency Flag in frame 69 was not set, the software continues to frame 71, where two distinct timers 1 and 2 are incremented in the main program loop to control starting and operation of construction machine 56. In frame 72 timer 1 is set to protect the starter (not shown) of construction machine 56 by limiting the duration of power applications to the starter mechanism to a predetermined time interval, for example a maximum of 20 seconds. In frame 74 timer 2 is set to automatically log off any administrator after an idle period of a predetermined time interval, such as 2 minutes.

Any wireless communication provided by cell modem 34 shown in FIG. 1, is controlled by the processor 18, or a processor (not shown) of the cell modem 34. In frame 76, the software controls any incoming and/or outgoing messages for remote communication by checking for Communication Request from cell modem 34. If there was a Communication Request in frame 76, the software proceeds to process this Communication Request and, in the frame 77, if necessary, generates a reply. Whether following frame 76 or frame 77, the software continues to frame 78, where it checks for any key pressed at keypad 16 shown in FIG. 1. If there was no Communication Request in frame 76, the software also continues to frame 78. If there was a keypad press in frame 78, the software continues to frame 79. In frame 79 the completed key press is processed before returning from frame 80, termed Goto Main, to frame 60. If there was no keypad press in frame 78, the software continues to frame 80, and then returns to frame 60, thus starting a new loop of the algorithm 82.

While the best modes for carrying out the invention have been described in detail, those familiar with the art to which this invention relates will recognize various alternative designs and embodiments for practicing the invention within the scope of the appended claims.

The invention claimed is:

1. A method of controlling and monitoring operation of a motorized device having a keyless start arrangement configured to activate the motorized device, the method comprising:

initiating, by a rental management source remote from the motorized device, communication of an authorization code to a processor communicatively coupled to a memory, wherein the processor is configured to regulate operation of the motorized device by a rental user, and is operatively connected to the keyless start arrangement;

receiving, by the processor, the authorization code via a first wireless communication path;

storing, by the processor, the authorization code within the memory;

receiving, by the processor and via a second communication path, an access code manually entered by the rental user, wherein the second communication path is different from and independent of the first wireless communication path;

determining, by the processor, an authorization timeframe defining a rental period during which operation of the motorized device by the rental user is authorized, wherein the authorization timeframe is based upon a rental agreement between the rental user and the rental management source, and wherein the rental agreement specifies the rental period;

comparing, by the processor, the access code to the authorization code;

determining, by the processor, whether the authorization timeframe has elapsed; and one of:
if: i) the access code matches the authorization code, and ii) the authorization timeframe has not elapsed, authorizing, by the processor, activation of the keyless start arrangement and operation of the motorized device by the rental user, or if at least one of: i) the access code does not match the authorization code, or ii) the authorization timeframe has elapsed, preventing, by the processor, activation of the keyless start arrangement and operation of the motorized device by the rental user.

2. The method of claim 1, wherein said initiating, by the rental management source remote from the motorized device, communication of the authorization code is accomplished remotely relative to the motorized device, and the rental management source is one of a host computer or a cellular telephone.

3. The method of claim 2, wherein said initiating communication of the authorization code is accomplished via a cell modem.

4. The method of claim 3, wherein said authorizing operation of the motorized device is limited to operating only during the rental period.

5. The method of claim 1, further comprising detecting, by the processor, unauthorized operation of the motorized device, wherein the unauthorized operation is signified by operation of the motorized device occurring outside the authorization timeframe.

6. The method of claim 5, further comprising communicating, by the processor, said detection of unauthorized operation to the rental management source.

7. The method of claim 6, further comprising remotely deactivating, by the processor, the operation of the motorized device when operation of the motorized device occurs outside the authorization timeframe.

8. The method of claim 1, further comprising receiving, by the processor, the access code manually entered by the rental user via a keypad located on the motorized device or on a cellular telephone.

9. The method of claim 1, wherein the motorized device is one of a passenger vehicle or a construction machine.

10. The method of claim 9, wherein the keyless start arrangement is a keyless ignition system of one of the passenger vehicle or the construction machine.

11. A system for controlling use of a motorized device, the system comprising:
- a keyless start arrangement configured to activate the motorized device for operation by a rental user;
- a processor communicatively coupled to a memory and operatively connected to the keyless start arrangement, the processor configured to at least:
  - receive an authorization code from a rental management source remote from the motorized device;
  - store the authorization code within the memory;
  - receive an access code manually entered by the rental user of the motorized device;
  - determine an authorization timeframe defining a rental period during which operation of the motorized device by the rental user is authorized, wherein the authorization timeframe is based upon an agreement between the rental user and the rental management source, and wherein the agreement specifies the rental period;
  - compare the access code to the authorization code;
  - determine whether the authorization timeframe has elapsed; and
  - one of:
    - if: i) the access code matches the authorization code, and ii) the authorization timeframe has not elapsed, authorizing, by the processor, activation of the keyless start arrangement and operation of the motorized device by the rental user, or
    - if at least one of: i) the access code does not match the authorization code, or ii) the authorization timeframe has elapsed, preventing, by the processor, activation of the keyless start arrangement and operation of the motorized device by the rental user.

12. The system of claim 11, wherein the rental management source is one of a host computer or a cellular telephone configured to communicate the authorization code remotely relative to the motorized device.

13. The system of claim 12, wherein the authorization code is communicated via a cell modem.

14. The system of claim 13, wherein the processor is configured to authorize the operation of the device only for the defined rental period.

15. The system of claim 14, wherein the processor is further configured to detect unauthorized operation of the motorized device, and wherein the unauthorized operation is signified by operation of the motorized device occurring outside the defined rental period.

16. The system of claim 15, wherein the processor is further configured to communicate a signal indicative of the detected unauthorized operation to the rental management source via the cell modem.

17. The system of claim 16, wherein the host computer is further configured to remotely shut down the operation of the motorized device when unauthorized operation is detected.

18. The system of claim 11, further comprising a keypad located on the motorized device.

19. The system of claim 11, wherein the access code is entered remotely with respect to the motorized device via a cellular telephone.

20. The system of claim 11, wherein the motorized device is one of a passenger vehicle or a construction machine, and wherein the keyless start arrangement is a keyless ignition system of one of the passenger vehicle or the construction machine.

21. The method of claim 1, wherein the first wireless communication path is at least in part a cellular communication path, and wherein the second communication path is one of: i) a wired communication path between the processor and a physical keypad of the motorized device, or ii) a wireless communication path between a physical keypad of a cellular telephone of the rental user and the processor.

* * * * *